April 8, 1958 — H. A. SHABAKER ET AL — 2,829,751
SOLIDS WITHDRAWAL SYSTEM
Filed Feb. 8, 1957 — 3 Sheets-Sheet 1

INVENTORS.
Hubert A. Shabaker
& Robert M. Shirk
BY William Klabunde
ATTORNEY.

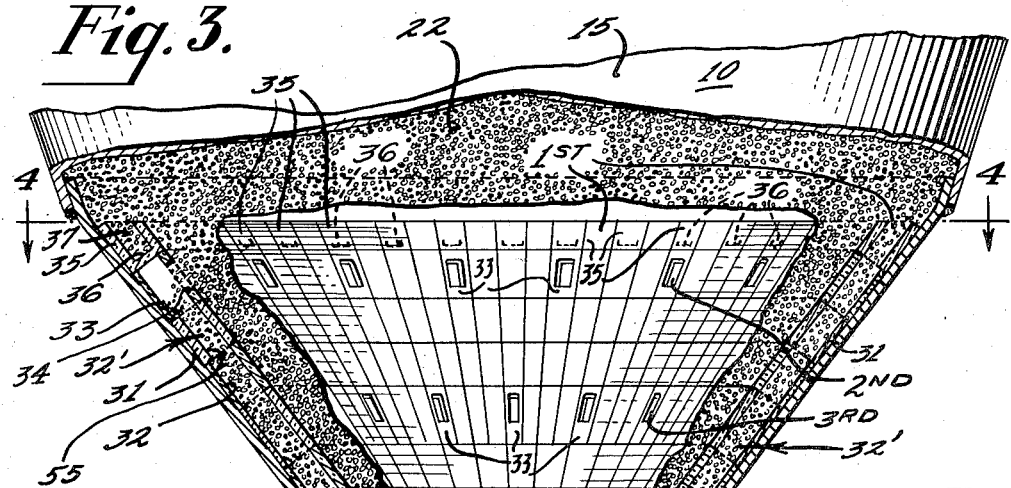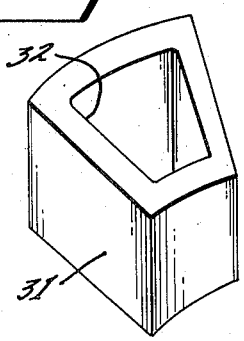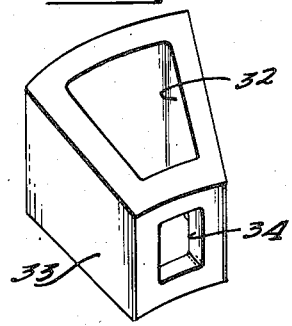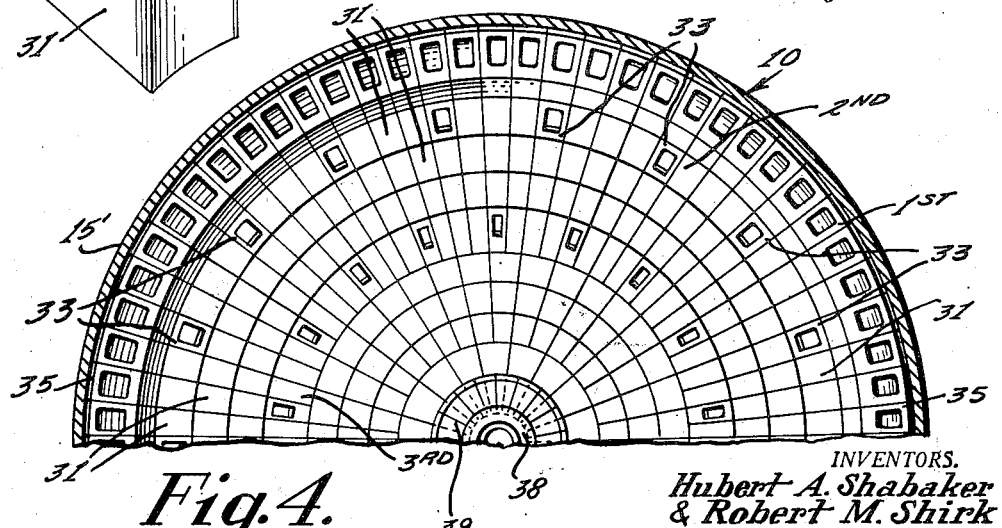

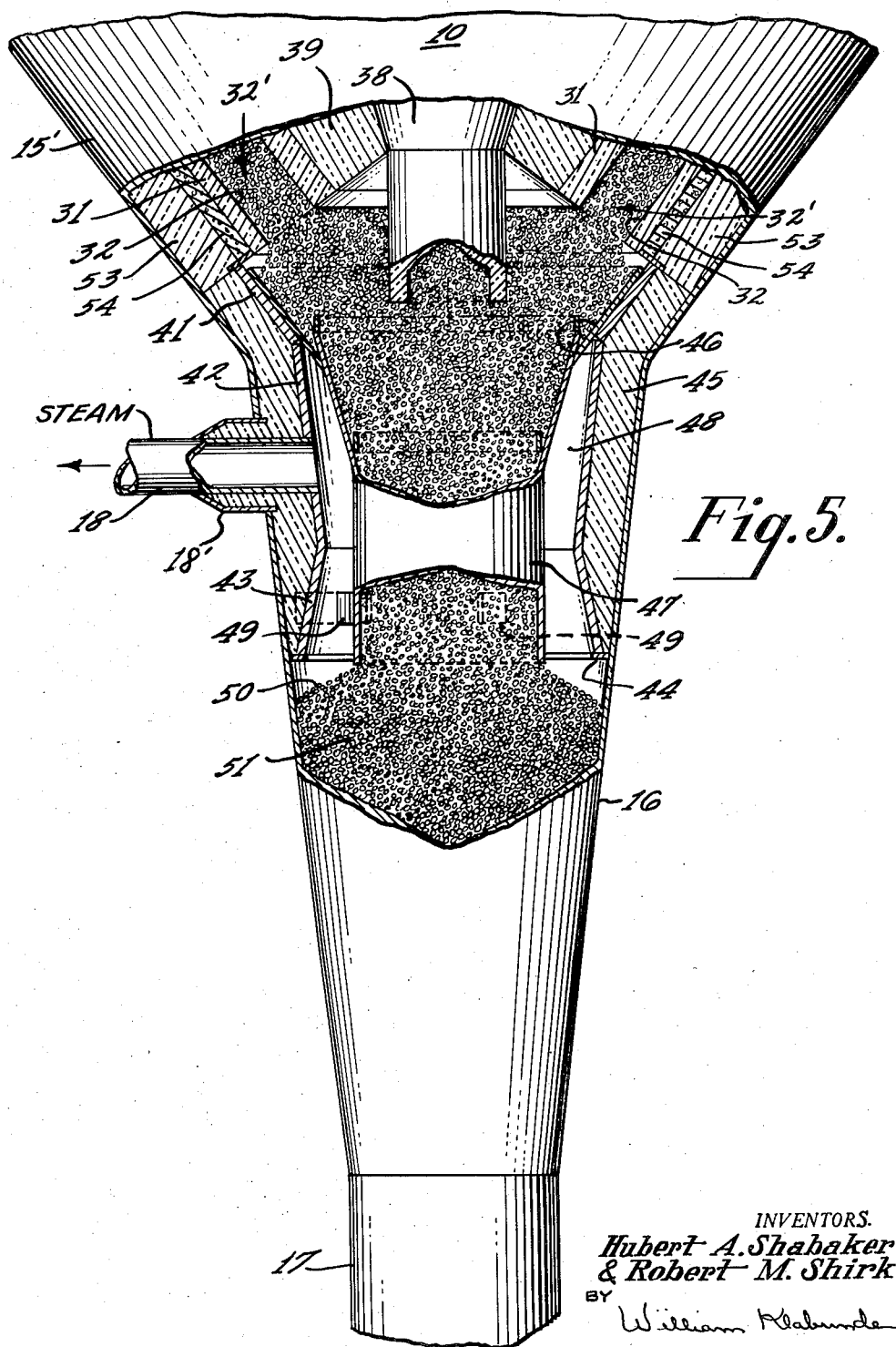

2,829,751

SOLIDS WITHDRAWAL SYSTEM

Hubert A. Shabaker, Media, Pa., and Robert M. Shirk, Wilmington, Del., assignors to Houdry Process Corporation, Wilmington, Del., a corporation of Delaware Application February 8, 1957, Serial No. 639,020

4 Claims. (Cl. 193—1)

This invention relates, in general, to processing systems involving a continuous gravitational flow of granular contact material in the form of a compact moving bed through a treating zone or vessel, particularly where it is desired to maintain a uniform downward flow of the granular solids throughout substantially the entire cross-sectional area of the bed. More particularly, the invention is directed to an improved method and apparatus for withdrawing the granular material from the bottom of the bed-containing vessel in such manner as to maintain a uniform flow pattern upwardly into and through the upper regions of the moving bed, in which regions one or more of the contacting operations may be effected.

The invention has special application to hydrocarbon conversion and other chemical processes wherein granular contact material gravitates through a confined zone in the form of a relatively-broad compact moving bed and is continuously discharged from the bottom thereof as a single compact moving stream or column.

While various methods and means have heretofore been employed in the aforementioned systems for effecting relatively uniform solids draw-off from the bottom of a compact moving bed of granular contact material, they have for the most part required a substantial use of internal devices such as tube-sheets, nipples, baffles, etc., interposed directly in the path of solids flow. In certain cases, such as where extremely high temperatures or other conditions detrimental to such internal devices are employed, it has been found desirable to eliminate, insofar as it is possible, all internals which may readily become damaged in use and possibly require premature shutdown of the treating unit for purposes of repair or replacement of the damaged elements.

One such expedient for eliminating internal flow-directing elements within a compact moving bed has been to pass the moving bed of granular material from the open bottom of one cylindrical confining vessel, comprising a contact zone, into a broader cylindrical vessel, comprising a disengaging zone, wherein the granular material expands outwardly to form a broader bed having an annular exposed surface of solids adjacent to and externally of the lower perimeter of the first-mentioned vessel. For convenience of description, such type of disengager will herein be referred to as an "annular disengager," since the gaseous material is disengaged from the solids at the annular exposed surface of solids, and is collected in an annular gas-collecting plenum of which such exposed surface forms the lowermost boundary.

While the present invention is particularly disclosed in association with the so-called annular disengager it is not to be construed as being limited thereto. The reason for any special applicability of the invention to the annular disengager is that the flow of gaseous material from the contacting zone into the broader disengaging zone causes a concentrated movement of gas outwardly and then upwardly in the peripheral regions of the expanded bed. Such cross-current and countercurrent movement of gas with respect to the general downward movement of solids tends to cause an unevenness of solids flow in the outer portions of the expanded bed, and this is particularly so when the granular material is withdrawn from the bottom of the expanded bed directly into a central draw-off conduit of relatively small flow area.

Typical of the systems to which the draw-off method disclosed herein may be advantageously applied is that shown in U. S. Patent 2,734,805 of R. T. Savage et al. which embodies an annular disengager in conjunction with internal disengaging channels distributed throughout the bottom level of the treating zone. The disengaging channels of the Savage et al. patent constitute the internal devices which have been referred to herein as being less desirable at extremely high operating temperatures. Elimination of such disengaging channels would of course convert the disengaging system of Savage et al. into a true annular disengager.

It has been found that where the granular material contained in the expanded compact moving bed of an annular disengager is made to flow in the lower region thereof as a relatively long inverted cone of solids discharging into a single long discharge conduit or seal leg there is a pronounced tendency for the solids to flow non-uniformly, or to actually cease flowing, in the peripheral regions of the bed. Flow difficulties are experienced in the region directly beneath the annulus or disengaging surface. It is therefore an object of the present invention to provide a solids draw-off method and a system therefor which will effect a substantially uniform withdrawal of solids throughout the entire horizontal extent of the expanded bed, without the necessity for providing within the flowing mass of solids any internal flow-directing devices which are in a position to suffer damage as a result of the extremely severe conditions of operation.

In accordance with the present invention, the granular solids are made to flow compactly in the bottom region of an annular disengager in the form of an inverted cone and are withdrawn from the compact mass or bed at a plurality of withdrawal locations uniformly distributed about the periphery of the cone at each of a plurality of levels, so that portions of the solids are withdrawn from peripheral locations progressively nearer the vertical axis and the apex of the conical bed. The solids withdrawn at each peripheral outlet are conveyed toward the apex of the cone as separate confined compact moving streams flowing along elemental lines of the cone toward a central discharge outlet at the apex.

By reason of space limitations in the bottom region of the cone, and in order to assure that the flow area of the separate streams will not diminish below a predetermined minimum required to maintain continuous flow, adjacent streams of flowing solids are combined at each of several levels along the vertical extent of the cone, thereby progressively decreasing the number of streams which convey the withdrawn solids to the single discharge outlet.

In a preferred application of the invention, although not limited thereto, granular solids in the form of a compact moving bed and gaseous material flow concurrently downward through a cylindrical treating zone and discharge from the open bottom thereof into a larger zone wherein the bed expands to form an annular exposed surface of solids through which the gaseous material is disengaged from the granular material and is collected in a confined annular plenum or collecting zone contiguous to the exposed surface of solids. The expanded bed is supported within a conical section at the bottom of the larger zone, forming a funnel for the discharge of the granular material into a single draw-off conduit or seal leg. The sloping sides of the conical or funnel-shaped solids draw-off section are at such angle to the horizontal that the granular material readily flows downwardly into the neck of the funnel. The angularity of the cone with respect to the horizontal is substantially greater than the angle of repose for the particular granular solids employed, and is substantially less than the angle between the horizontal and the sides of the cone of solids flow, that is, the cone of uniformly flowing solids formed within a compact moving bed of such solids while they are discharging through a central opening in the bottom of the vessel containing the bed. A preferred angle for the conical sides of the vessel will be found in the range of about 45–55°.

For extremely high temperature operations an especially advantageous construction for the solids draw-off section is obtained by integrating the draw-off conduits for the granular material in a circumferentially-complete refractory lining comprising hollow tile members of such configuration as to permit their being set in a plurality of tiers around the inner wall surface of the conical section at the bottom of the bed-containing vessel. The hollow tile members are set one above the other in refractory mortar. The passageways in the superimposed tiles are aligned to form sub-surface conduits or channels which convey the granular material downwardly as a plurality of confined streams separate from and directly under the bed-supporting surface of the tile and toward the central draw-off conduit at the bottom of the cone, where the plurality of separate streams are combined to form a single discharge stream.

For a fuller understanding of the invention, reference may be had to the accompanying drawings forming a part of this invention in which:

Fig. 3 is an enlarged sectional elevation of the conical draw-off section of the heater unit, with portions removed to more clearly show both a cross-section of the vessel walls and the inner surface of the tiled portion of the cone;

Fig. 4 is a plan view of Fig. 3, along line 4—4 of Fig. 3, with the granular material omitted in order to clearly show the arrangement of the hollow tile members and the location of the various inlet openings which communicate with the sub-surface conduits or passageways extending through the tiles and converging toward the apex of the cone;

Fig. 5 is an enlarged fragmentary section of the bottom portion of the conical draw-off section and the upper portion of the discharge conduit or seal leg connected thereto;

Fig. 6 is a perspective view of one of the conduit-forming tile members; and

Fig. 7 is a perspective view of an inlet tile member, which has an opening on its inner face to receive the granular material.

Figures 1, 2:
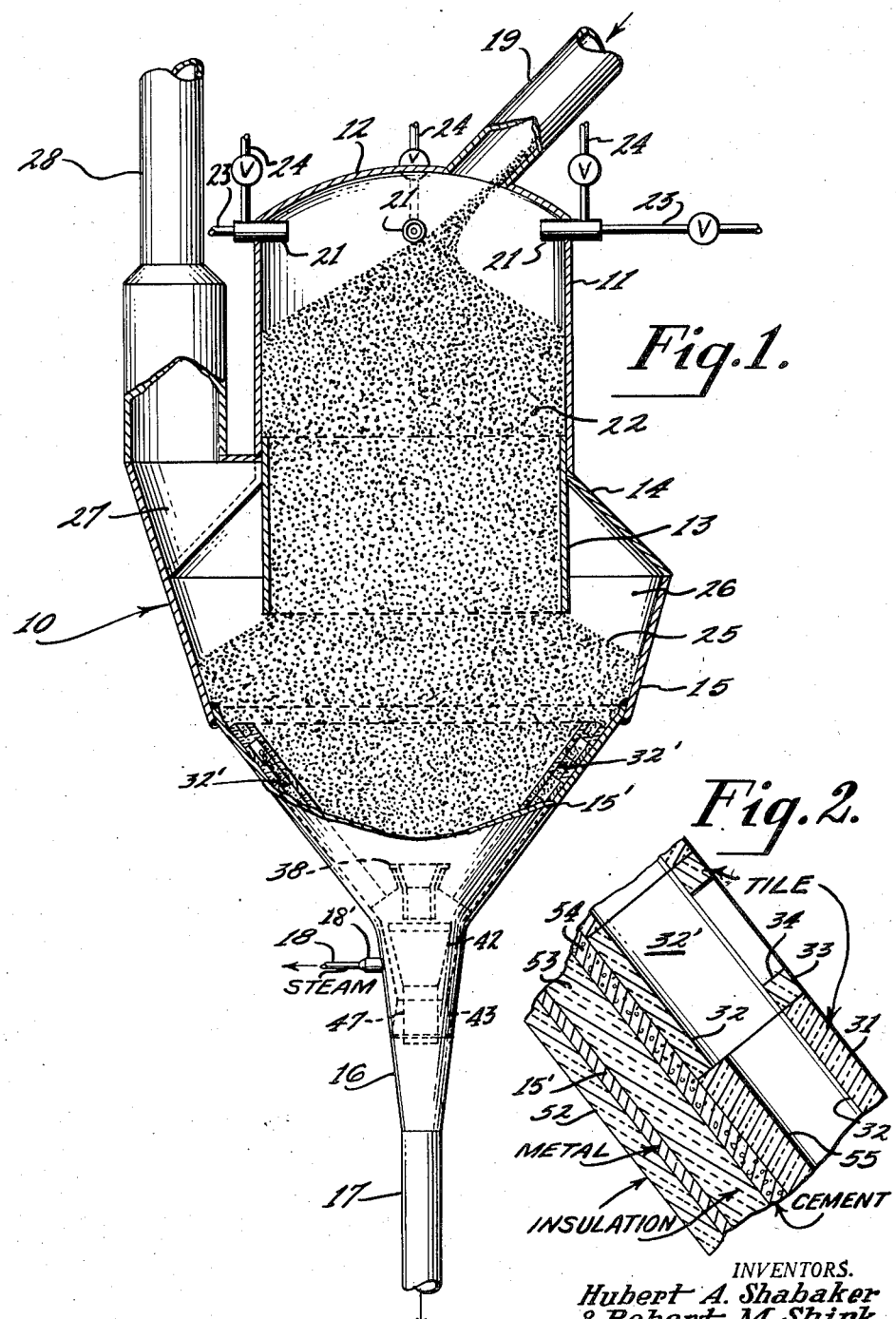
Fig. 1 is a sectional elevation of a treating vessel, such as a pebble heater, to which the granular material draw-off means of the present invention may be applied.
Fig. 2 is a fragmentary section through a wall of the draw-off cone at the bottom of the heater vessel, showing the arrangement of insulating means and conduit-forming members.

For the purpose of describing and illustrating the application of the invention, the heater unit shown in the drawings will be considered herein as comprising the heater unit of a system of the general type disclosed in U. S. Patent No. 2,432,962.

In Fig. 1, the heater unit, generally indicated by the numeral 10, is shown as a vessel of irregular outline composed of assembled segments, each being a surface of revolution, so that the vessel is circular in cross section.

The upper portion of vessel 10 comprises a cylindrical member 11 having a dished head 12 closing its upper end and having an open lower end. Member 11 is provided with a lower cylindrical extension 13 telescopically connected thereto and forming a fixed internal skirt extending downwardly within the lower portion of vessel 10.

The lower portion of vessel 10 comprises a plurality of frusto-conical sections 14, 15 and 15'. Frusto-conical section 14 has its apex uppermost and is secured along its upper edge to the lower edge of cylindrical member 11. Frusto-conical sections 15 and 15' are joined to form a stepped inverted cone, that is, with upper and lower segments of different angularity. The upper edge of frusto-conical section 15 is secured along the lower edge of section 14. The inverted cone formed by sections 15 and 15' may, if desired, be formed as a single frusto-conical member of uniform angularity throughout its length.

The lower end of conical section 15' terminates in an integral converging tubular neck portion 16. A discharge conduit 17 is attached at its upper end to the neck portion 16. Neck portion 16 is adapted to receive internal flow-directing means associated with the draw-off conduits of conical section 15', hereinafter to be described in connection with Fig. 5, and is provided at the side with a gas outlet 18 for the emission of steam from conduit 17, which latter conduit when filled with compactly flowing solids forms a seal leg.

The upper end of cylindrical member 11, which together with its extension 13 forms the heating chamber, is provided with an inlet conduit 19 through which pebbles or other granular material are introduced into the heating zone. The granular refractory material in the form of spheres, pellets, etc., having an average diameter in the range of about 2–15 mm. is continuously received through conduit 19 from an elevated supply zone to which the material has been conveyed from a lower level by suitable lift means of known design, not shown. Such lift may, for example, operate continuously to maintain a continuous circulation of the granular material through a system comprising the heater unit 10 and a treating zone, not shown, which is directly below and which receives the granular material as a compact moving stream through discharge conduit 17. Conduit 17 in such case provides a seal leg between the heater unit 10 and the vessel containing the lower treating zone and is of a length sufficient to provide a gas seal preventing undesirable migration of gaseous material between the vessels.

A plurality of internal burner nozzles 21 are set in the wall of cylindrical member 11 at uniformly spaced locations about its upper end, so that heat may be supplied above the surface of the compact moving bed of solids 22 descending through cylindrical member 11 and its extension 13, and through conical sections 15 and 15'. Air required to support combustion is supplied to the burners 21 through valve-controlled inlet lines 23, and fuel in the form of oil or gas is supplied to the burners through valve-controlled inlet lines 24.

Coke deposited on the pebbles in a reaction zone which may be located beneath the heater unit 10 will normally provide most of the fuel required to supply the heat of combustion necessary to keep the unit in over-all heat balance, and it is contemplated that only such additional fuel will be supplied through lines 24 as may be needed to supply any additional heat required in the heating chamber.

The gaseous material flowing downwardly from the heating zone, that is, the cylindrical chamber formed by members 11 and 13, is disengaged from the granular material as the latter flows from the open bottom of member 13 into the larger conical member 15 and spreads to form therein an expanded lower portion of the bed 22. The gaseous material is disengaged from the granular material at the annular exposed surface of solids 25 which is formed as the granular material flows outwardly within the larger vessel. The disengaged gas is collected in the annular plenum 26 formed between the bottom portion of the cylindrical member 13 and the sloping sides of frusto-conical members 14 and 15. The gaseous material or flue gas collected within the plenum 26 is thereafter discharged through an outlet housing 27 and is passed to a stack 28 located at one side of the vessel. In order that the granular material forming the compact moving bed 22 may flow uniformly along its downward path through the heating zone and through the disengaging zone containing the expanded portion of the bed, an arrangement of draw-off conduits or channels is provided within the conical section 15'. The draw-off conduits are so arranged that the solids may be withdrawn substantially uniformly from all regions of the bed and be passed into the seal leg or discharge conduit 17.

The system of solids draw-off conduits is located within the bottom conical section 15', as shown in Figs. 1, 3 and 4, and serves to convey separately withdrawn individual streams of solids along confined paths located beneath the bottom portion of the bed 22 and converging toward the apex of the conical section. In other words, the flow paths for the withdrawn solids are formed along elemental lines of the conical bottom section 15'. The structure for uniting the withdrawn streams of solids with the remaining portion of the main axial stream and for introducing the combined streams into the discharge conduit or seal leg 17 is shown in Fig. 5.

Since the separate streams of withdrawn solids flow along paths which coincide with elements of the cone, the paths diminish gradually in flow area because of their convergence. In order to assure a continuity of flow, pairs of adjacent streams are combined at successively lower levels in the conical section 15', so that the number of conveyed streams is diminished by one-half at each combining level. Because of the convergence, the tiles become narrower at each successively lower horizontal tier, although the general configuration may remain the same. Several tile shapes are required, dependent upon whether they serve as conveying members, inlet members, or closure members.

The tiles 31, which serve merely to convey the separate streams of granular material, including those which serve as receiving tiles in the uppermost course or tier, are of the general configuration shown in Fig. 6, having a passage 32 from end to end. Tiles 33 which serve as inlets for granular material are of the general configuration illustrated in Fig. 7, having, in addition to the end-to-end passage 32, an inner face opening 34 through which the solids are admitted from the bed 22 into the passage 32. Still other tiles 35, which serve to close the upper ends of certain of the longitudinal conduits 32 formed by the alignment of passages 32 of the superimposed tiles 31 and 33, are illustrated in Fig. 3. Tiles 35 are chamfered at their upper open ends and are closed at their lower ends, as at 36.

The invention is not limited with respect to the number of longitudinal conduits or passages 32' or with respect to the number of horizontal courses which are formed in tiling the bottom portion of the cone 15'. Neither is the invention limited to the number of levels at which the granular material is withdrawn from the conical bottom portion of the bed 22.

In the particular embodiment of the invention illustrated in the drawings, ten circular courses of tiles have been shown, with provision for solids introduction at each of the tenth, ninth and sixth courses, which courses, for the sake of convenience, are numbered upwardly from the bottom of the cone in the order in which they are laid. Each conduit 32', however, has only one inlet opening for receiving granular material from bed 22. None of conduits 32' has more than one inlet for receiving granular material. Therefore, since there are three levels of withdrawal, that is, at the sixth, ninth and tenth courses, every other conduit 32' or every second and third of such conduits 32' may be headed by a blocking tile 35, dependent upon whether it is desired to have each of the two shorter conduits paired with a long conduit or to have the three different-length conduits 32' arranged as a repeated series around the conical section.

In the present arrangement, the conical section 15' is divided into seventy-two segments in the uppermost five courses, that is, courses six through ten, each containing a conduit 32'. As illustrated, every other segment in the top five courses contains a through conduit 32' which is open at its upper end so as to withdraw solids from the bed 22 at the uppermost draw-off level. The intermediate segments at the same level contain conduits 32' which are headed by tiles 35 having a bottom closure 36, as shown in Fig. 3. Thus, there are thirty-six draw-off openings at the first withdrawal level. The blocked tiles 35 become filled with solids, as at 37, which remain as fixed, or so-called stagnant, regions of the bed. The three withdrawal levels are designated 1ST, 2ND and 3RD in Figs. 3 and 4 of the drawings, that is, in descending order or the order of withdrawal from the gravitating bed.

At the second and third levels of withdrawal, that is, at courses nine and six, respectively, every fourth one of the seventy-two tiles is an inlet tile 33 of the type shown in Fig. 7. The inlet openings 34 of these two courses are staggered, and each conduit 32' with an opening 34 is separated at each side from the next nearest conduit 32' having a similar opening by a through conduit which receives solids at its uppermost end, the sequence or arrangement being illustrated in Figs. 3 and 4.

As each of conduits 32' converges toward the apex of the conical section 15' the flow area for the withdrawn stream of solids necessarily decreases, so that a point is reached where the stream must be combined with an adjacent stream in order to prevent bridging of the solids and stoppage or undesirable constriction of flow. Thus, at the juncture between courses six and five the number of tiles is decreased by one-half, each of the tiles at course five receiving the discharge from both a through conduit 32' and a conduit 32' having an intermediate inlet opening 34. The number of tiles in the fifth course is repeated through the fourth and third courses, and at the second course the number of tiles is again reduced by one-half. Thus, at the second course there are eighteen tiles, each receiving the combined flow of what were four streams of withdrawn solids at the sixth course and two streams from the fifth through the third course. The first course has the same number of tiles as the second course, so that the initial seventy-two streams of withdrawn solids reach the lowermost combining level near the apex of the cone as eighteen separate streams. The portion of solids, principally from the central region of bed 22, which has not been withdrawn at the first, second, and third levels of withdrawal continues to flow toward the axis of the conical section and is discharged axially through a central tubular tile 38 which has a cylindrical lower portion and an outwardly flared upper portion. A circumferential row of skewback solid tiles 39 is set with broken joints along the inner face of the first course of hollow tiles so as to bridge the opening between the conduit-forming wall tiles 31 and the axial draw-off tile 38, the annular row of tiles 39 having their inner periphery shaped to receive the outwardly flaring upper portion of tile 38.

The draw-off arrangement at the apex of the cone shown in Fig. 3 is more clearly illustrated in the enlarged fragmentary view of Fig. 5.

From the bottom of the tiled area in section 15' to a level below steam outlet 18 in neck portion 16 the walls of vessel 10 are lined with a re-enforced layer of castable refractory insulating material which may be applied by gunning. A metal grating spaced inwardly from the vessel walls and comprising joined frusto-conical sections 41, 42 and 43 is supported upon a flat metal ring 44 secured to the inner wall of neck 16. The metal grating re-enforces and is embedded within the castable material 45. The insulating material is applied also around the portion of steam conduit 18 which passes through the wall of neck portion 16, a short insulating sleeve 18' being provided for such purpose, as shown.

A short frusto-conical metal support ring 46 is set upon the portion of the insulation containing embedded metal grating 41. Ring 46 is of such size as to overhang the side walls of the insulation-lined neck portion 16.

The lower end of the central tubular tile 38 terminates slightly within the upper end of ring 46, at which level the central solids stream flowing from tile 38 joins with the combined streams of solids flowing from passageways 32′.

A second tubular conduit 47, having a shape similar to that of member 38 but being fabricated of metal instead of refractory tile, is set within the support ring 46. The flared upper portion of conduit 47 rests upon the perimeter of the support ring 46, and its cylindrical lower portion depends within tubular neck 16 to a level slightly below the lower end of the insulation-lined portion. Conduit 47 is of such diameter as to provide an annular space 48 between it and the insulation lining wherein steam disengaging itself from the flowing solids may collect and be discharged through outlet conduit 18.

The single stream of combined solids passing through tubular member 47 discharges at an intermediate level within the tubular neck portion 16 of the conical section 15′, such discharge level being well below the steam outlet 18.

In order to maintain concentricity between the tubular neck 16 and the cylindrical lower portion of conduit 47, a series of centering lugs 49 is provided about the inner wall of the neck, the lugs being attached to the tubular neck and projecting through the insulation.

Although not shown in the drawing, it is to be understood that at the bottom of the downflow path including the vessel 10 and the seal leg conduit 17 there is sufficient control or constriction on the flow of solids to maintain the solids throughout such path as a compact flowing column. Thus, the solids forming bed 22 within the vessel 10, and the solids flowing through passageways 32′ and conduits 38, 47, 16 and 17 are maintained as a vertically continuous compact moving mass. Since conduit member 47 is of substantially smaller diameter than tubular neck portion 16 of the conical section 15′ the solids flowing from the lower end of conduit member 47 spread outwardly and form a broader stream 51, having an annular exposed surface of solids 50 surrounding the lower end of conduit 47. Steam introduced at a low level within the compact moving stream 51 will flow upwardly and disengage through the exposed surface 50. This is true also for any gas flowing downwardly with the solids through conduit 47.

As stated, the present embodiment of the invention has particular application to the problem of transporting solid granular contact material in processes employing relatively high temperatures, that is, temperatures in excess of the practical maximum which can be tolerated in vessels having internal, steel-fabricated structural members located in the path of the gravitating hot solids. It is therefore essential in such use that internal and external insulation be provided to control the temperature of the structural elements, and that suitable provision be made for expansion and contraction of such elements as a result of substantial temperature change.

Although it has not been considered necessary to show in all figures of the drawings the layers of insulation which normally would be required for high-temperature operation, it will be understood that conventional insulation is to be applied both internally and externally, where needed. In the enlarged views of Figs. 2 and 5 portions of insulation have been illustrated.

In Fig. 2, the metal wall or shell of conical section 15′ has an external covering 52 of suitable insulating material, applied in known manner. Internally of the metal shell there is first a relatively thick layer of insulating material 53 which is then faced by a thinner layer of cement or grout 54. The tiles 31 and 33 are set, without bonding, upon the hardened surface of the grout 54, so that with temperature changes the outer face or surface of the tile layer may expand or contract freely along the grout surface. It is important that the layers of insulation 53 and 54 be formed of materials which are capable of withstanding the substantial compressive forces acting normal to the surface of the grout when the vessel is loaded with solids.

To allow for erosion of the internal wall surface of passageways 32′ in the regions where the solids entering through the opening 34 are likely to have an abrasive action, the tile 31 next below each inlet tile 33 is provided with an increased outer wall thickness, as shown in Fig. 3, the purpose of which is to create a slight ledge 55 capable of retaining a thin layer of non-moving solids extending upwardly along the internal bottom surface of the inlet tile so as to form a protective cushion. With such arrangement, erosion occurs primarily on the solid particles rather than on the wall surface of the tile. The tiles of oversize wall thickness are placed only in those passages which have intermediate inlet openings, and then only in the course directly below the course having such inlet tiles. Thus, no passageway 32′ has more than one tile of increased wall thickness.

It is important that the refractory tiles be laid with extreme care, so that the tile surface which contacts the solids bed 22 will be sufficiently smooth and even to facilitate the movement of solids downwardly over the conical surface. To achieve such desirable alignment, the tiles may be pre-cast, and then the end surface areas may be carefully machined or ground to provide the proper fit.

With respect to the angularity of conical section 15′, it is of course essential that the slope of the sides be such as to maintain a continuous smooth flow of solids both along the inner face of the tile and through the passageways 32′. While the optimum angle may vary somewhat in accordance with the characteristics of the tile and of the solids, an angle in the range of about 45°–55° to the horizontal is considered most practical. In a specific commercial application, an angle of 52° to the horizontal for the sloping walls of the conical section 15′ has proved entirely satisfactory from the standpoint of assuring uniform solids flow through the vessel 10.

Since all the passageways 32′, as well as the central draw-off conduit 38, are filled with compact flowing solids which discharge into the support ring 46, the proportion of solids flowing into ring 46 from the total of peripheral passageways 32′ and from the single central conduit 38 will be in the ratio of the annular flow area to the circular flow area of members 46 and 38, respectively, at the discharge level of conduit 38. Thus, by a predetermined proportioning of the flow area of conduit 38 and the annular flow area measured horizontally between its lower end and the side walls of member 46, any desired flow ratio between the amount of solids passing axially through the conical section and the total amount of solids passing through the peripheral conduits may be obtained. Likewise, the adjacent combining streams of solids at the juncture of the fifth and sixth courses contribute to the single stream formed by their combination amounts of solids which are in proportion to the flow areas of the adjacent combining streams at the juncture level. If the discharge openings at the bottom of the adjacent hollow tiles in the sixth course have identical flow areas, then each of their respective passageways 32′ will withdraw equal amounts of solids from the bed 22. Should it be desired to cause one of the passageways 32′ to withdraw solids at a greater rate than that of the adjacent contributing passageway, this can be accomplished either by pre-forming the tiles of the sixth course with their discharge openings in the desired proportion, or by introducing any suitable mechanical means which will provide the desired constriction of the adjacent flow paths. It is thus evident that the tiles of the sixth course, that is, the third level of solids withdrawal, may be considered key tiles for controlling the respective solids flow rates from the regions of the bed adjacent to openings 34 in tiles 33 and from the regions of the bed adjacent to the inlet tiles of the tenth course.

In the same manner, it is possible to proportion the flow of solids from pairs of adjacent tiles in the third course, at the juncture level where their streams are combined.

The invention is not in any way limited with respect to the number of courses in the tiled area of the conical bottom section of the heater or kiln, nor with respect to the number of tiles comprising a single course. Neither is it limited with respect to the number and arrangement of draw-off levels or draw-off tiles at a particular draw-off level. Furthermore, although an angle in the range of about 45°–55° to the horizontal has been expressed as being the most practical for the conical draw-off section, it will be understood that, where desired, angles considerably below or above this range may be employed, such as in the range of about 30°–65°. It is, however, important that the angle be at least as great as the angle of flow for the particular solids, and that it not be so great as to unnecessarily increase the length of the vessel or as to introduce compressive forces within the bed which may cause damage to the granular material or to portions of the apparatus.

It will be apparent to those skilled in the art that the invention is susceptible of various modifications and changes without departing from the spirit of the invention, and it is desired therefore that there shall not be placed thereon any limitations other than those limitations set forth in the appended claims.

What is claimed is:

1. A solids withdrawal system for uniformly withdrawing hot granular contact material from a treating vessel of circular cross section through which said material gravitates as a compact moving bed comprising: a conical section forming the bed-supporting bottom of said vessel, the side walls of said conical section being inclined to the horizontal at an angle sufficient to maintain a smooth flow of said granular material and terminating in a short lower neck portion adapted for attachment to the upper end of an elongated vertical receiving conduit; a plurality of hollow refractory tiles laid in horizontal courses around the inner sloping wall of said conical section, said tiles having through passages and being longitudinally aligned end-to-end to form peripheral solids withdrawal passageways or conduits converging toward the apex of said conical section, the longitudinal passageways formed by the upper courses of tile being alternately provided with solids inlets at the uppermost end and at either of two lower levels, the tiles in the course next below the course having the lowermost annular row of solids inlets each being of double width so as to receive discharging solids from a pair of adjacent passageways, and the tiles in one of the remaining lower courses also being of double width so as to receive discharging solids from a pair of adjacent passageways which already contain combined streams as aforesaid; a short axial solids withdrawal conduit at the bottom of said conical section adapted to discharge solids centrally within the locus of discharge of said peripheral passageways; short conduit means for receiving the total solids discharge from all said passageways and said axial solids withdrawal conduit and for transporting the same downwardly as a compact moving stream to a central discharge location within the upper end portion of said elongated received conduit; each of said passageways in the upper portion of said conical section having but one inlet for receiving said solids from the converging peripheral region of said bed.

2. Apparatus as in claim 1 wherein the number of tiles in said uppermost course is divisible by four, with alternate tiles in said course having a blocked passage; wherein every fourth tile in a lower course is provided with a side solids inlet in communication with said bed, said fourth tiles being in longitudinal alignment with the blocked tiles in said uppermost course; and wherein every fourth tile in a still lower course is provided with a similar solids inlet, said last-mentioned fourth tiles being in longitudinal alignment with the remaining blocked tiles of said uppermost course.

3. Apparatus as in claim 2 in which there are ten courses of tiles, with the second and fifth course being provided with double-width tiles so as to combine pairs of adjacent streams of solids from the third and sixth courses; and in which said side solids inlets are located in staggered arrangement in every fourth tile of the sixth and ninth courses.

4. A solids withdrawal system for uniformly withdrawing granular contact material from a treating vessel adapted to contain said material as a compact moving bed comprising: a bed-supporting, hopper-shaped bottom section of said vessel axially communicating at its lower end with an elongated discharge conduit, the side walls of said bottom section being inclined to the horizontal at an angle sufficient to maintain a smooth flow of said granular material; a layer of preformed hollow members completely surfacing the sloping inside walls of said bottom section, the hollow portions of said members providing passages therethrough and being aligned to form sub-surface conduits or passageways extending longitudinally down the sides of said bottom section and terminating at the apex thereof, certain of said passageways being open at their upper ends to receive solids at uniformly spaced locations about the periphery of said bed, certain other of said passageways being closed at their upper end and having solids-receiving inlets thereto at uniformly spaced locations about a lower peripheral region of said bed, and the remaining of said passageways also being closed at their upper ends and having solids-receiving inlets thereto at uniformly spaced locations about a still lower peripheral region of said bed; said passageways being combined in pairs to form half as many passageways at a plurality of levels below the lowest level of said solids-receiving inlets; means for receiving the discharging solids from the lower end of the ultimately reduced number of passageways as well as solids not withdrawn at said peripheral receiving inlets but continuing toward the apex of said bottom section; and means for passing the total combined streams of solids into the upper end of said elongated discharge conduit.

No references cited.